R. C. RUSSELL.
CHURN.
APPLICATION FILED JAN. 13, 1909.
961,802.
Patented June 21, 1910.
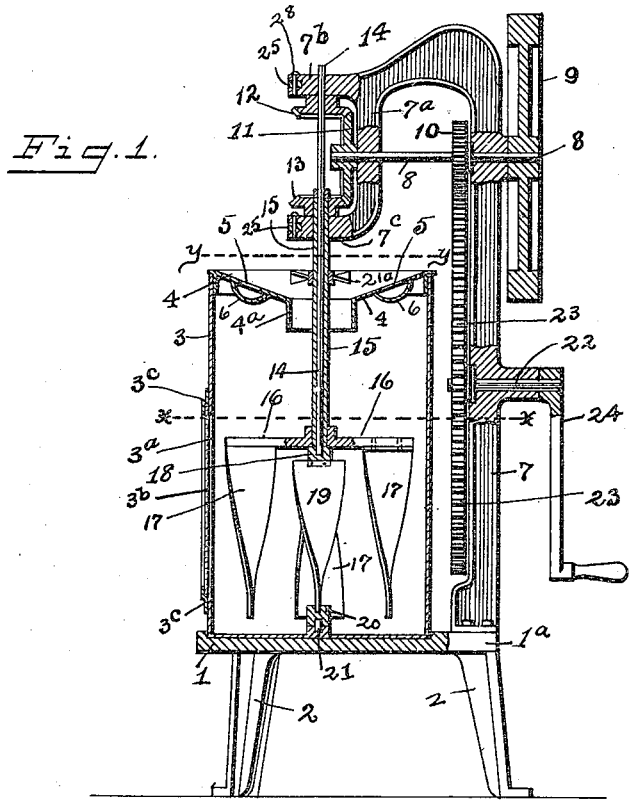
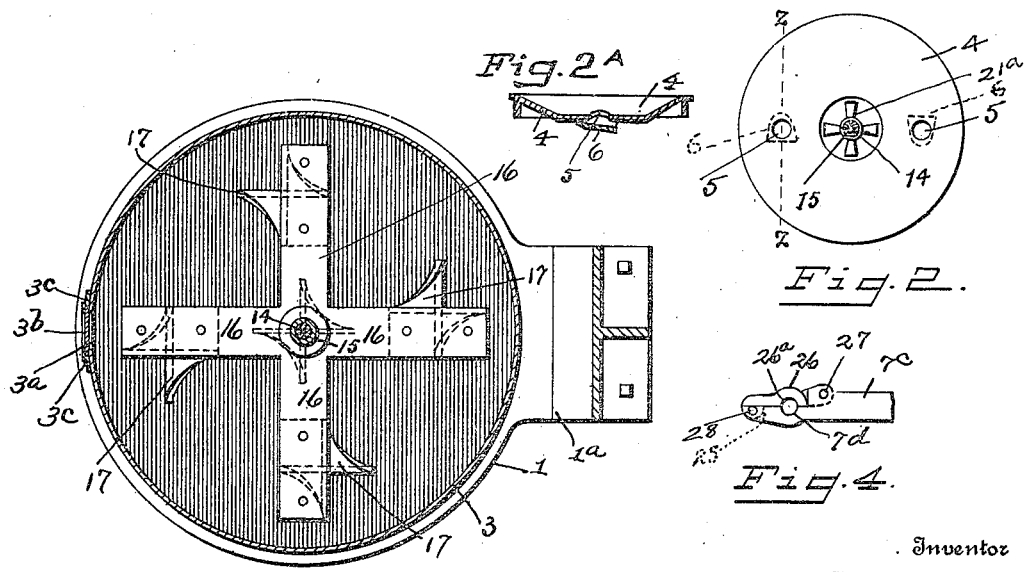
Witnesses
Carl Stoughton
A. L. Phelps
Inventor
Robert C. Russell
By C. C. Shepherd
Attorney

UNITED STATES PATENT OFFICE.

ROBERT C. RUSSELL, OF ARTHUR, ONTARIO, CANADA, ASSIGNOR OF FIFTEEN ONE-HUNDREDTHS TO GOMER T. GRIFFITHS, OF COLUMBUS, OHIO, AND THIRTY-FIVE ONE-HUNDREDTHS TO CLARENCE F. WARNER, OF NEW PHILADELPHIA, OHIO.

CHURN.

961,802.          Specification of Letters Patent.     Patented June 21, 1910.

Application filed January 13, 1909. Serial No. 472,036.

*To all whom it may concern:*

Be it known that I, ROBERT C. RUSSELL, a citizen of the United States, residing at Arthur, in the county of Wellington, Ontario, Dominion of Canada, have invented certain new and useful Improvements in Churns, of which the following is a specification.

My invention relates to churns of that class in which a rotary dasher is employed within a cylindrical churn body, and the objects of my invention are to provide an improved churn construction of this class whereby the butter elements of a quantity of cream contained within the churn may be quickly separated from the cream or milk; to so construct my improved churn and its dasher as to insure a thorough butter producing agitation thereof; to provide means for aerating the cream and butter during the process of separation, and to produce other improvements the details of which will be more fully pointed out hereinafter. These objects I accomplish in the manner illustrated in the accompanying drawing, in which:

Figure 1 is a central vertical section of my improved churn, Fig. 2 is a sectional view on line $y$—$y$ of Fig. 1, Fig. 2$^A$ is a detail sectional view on line $z$—$z$ of Fig. 2, Fig. 3 is an enlarged transverse section on line $x$—$x$ of Fig. 1, and, Fig. 4 is a plan view of one of the shaft supporting bracket arms of the gear frame.

Similar numerals refer to similar parts throughout the several views.

1 represents a horizontal churn casing supporting base or platform, which is preferably provided with suitable supporting legs 2. Upon the base 1 is removably supported a vertical churn body or casing 3 of cylindrical form, said casing being provided with a removable concaved cover or lid 4, the rim of which fits within the upper end of the casing. This cover 4 is formed with a central opening, from which extends downwardly a short open neck 4$^a$. In the body of the lid or cover 4 on the outer side of the neck 4$^a$, I form a plurality of openings 5 and beneath each of the latter, I provide a fixed inclined and curved plate or hood 6.

To the lateral extension 1$^a$ of the base 1, I secure an upwardly extending vertical gear frame member 7, said vertical member having a substantially hook-shaped upper termination which comprises a vertical arm portion 7$^a$ from the upper portion of which extends outwardly a horizontal bracket arm 7$^b$, while a similar bracket arm projects from the lower end of said member 7$^a$ as indicated at 7$^c$.

8 represents a horizontal shaft which is rotatably mounted in the vertical frame members 7 and 7$^a$. The outer end of said shaft carries a fly wheel 9 and on the inner side of the frame member 7, said shaft carries a pinion 10. In front of the arm 7$^a$ and between the bracket members 7$^b$ and 7$^c$, the shaft 8 carries a beveled gear wheel 11, the upper and lower sides of which gear engage with oppositely located bevel pinions 12 and 13. The pinion 12 is carried on the upper portion of a vertical shaft 14 which bears in the bracket arm 7$^b$ and the pinion 13 is carried by a tubular shaft 15 which has its upper bearing in the lower bracket arm 7$^c$. The tubular shaft 15 passes downward through the center of the cover neck 4$^a$ into the casing or can 3 and has affixed to its lower end within the can, a horizontal frame which preferably consists of two integrally formed crossed bars, which results in the formation of the radially arranged arms 16, which are shown more clearly in Fig. 3 of the drawing.

From the outer end portion of each of the arms 16, depends a twisted cream agitating blade 17, which blades extend to points near the bottom of the casing 3. The shaft 14 extends loosely or rotatably through the tubular shaft 15 and carries on its lower end beneath the junction of the dasher frame bars 16 a plug 18, with which is connected one end of a twisted dasher blade 19, the lower end of the latter being fixed in connection with a bearing block 20 which is rotatably mounted upon a short pin 21 projecting upward from a central boss of the bottom of the casing 3. Upon the tubular shaft 15 above the upper opening of the neck 4$^a$ is carried a small fan body 21$^a$ which comprises radially arranged blades, said fan body being of such size as to permit of its passage through the neck 4$^a$.

In the vertical frame member 1 is journaled a crank shaft 22 which on its inner end carries a comparatively large gear wheel 23 and which on its outer end is connected with a crank handle 24. The gear wheel 23 gears, as shown, with the heretofore described pinion 10.

In order to provide means for detachably mounting the shafts 15 and 14 in the bracket arms 7ᵇ and 7ᶜ, I form each of said bracket arms, as shown more clearly in Fig. 4 of the drawing, with a reduced outer end portion, in which a half-round vertical bearing depression 7ᵈ is formed, while the outer end of the arm is bifurcated and adapted to receive the tongue-like projection 25 of a swinging bearing member 26 which is hinged at its inner end, as shown at 27, to the bracket arm and which is provided with a vertical half-round bearing depression 26ᵃ which is adapted to form in conjunction with the depression 7ᵈ a vertical shaft bearing, when the member 26 is closed upon the members 7ᶜ or 7ᵇ. The swinging bearing section 26 is held in proper connection with the member 7ᶜ or 7ᵇ by means of a removable pin 28 which pierces oppositely located openings in the bifurcated end of the bracket arm and in the projecting tongue of the member 26.

In the wall of the casing or can 3, I provide a vertical sight opening 3ᵃ which is closed by a glass plate 3ᵇ, the latter being supported by a suitable frame 3ᶜ.

In operation, it will be understood that the turning of the crank handle 24 and the consequent rotation of the gear wheel 23 and pinion 10, will result in the rotation of the beveled gear wheel 11. The engagement of said beveled gear wheel with the pinions 12 and 13, causes said pinions to rotate in opposite directions, with the result that the shaft 14 and the shaft 15 likewise will be rotated in opposite directions, thereby turning the blade carrying bars 16 in one direction in the milk or cream contained in the can or casing and the central blade 19 in the opposite direction. In this operation it is obvious that the cream will be thrown by the central blade 19 into contact with the oppositely rotating blades 17, thus resulting in the rapid making and breaking of cream currents within the can and in such agitation of the cream, as to cause a ready separation of the butter elements therefrom, thereby permitting of an exceedingly rapid production of butter. The rotation of the fan 21ᵃ caused by the rotation of the shaft 15 on which said fan is mounted, will result in forcing a strong current of air through the cover neck 4ᵃ and into the material contained in the casing, while the hooded openings 5 will serve as outlets for the air thus driven into the casing. It will thus be seen that by the employment of the fan, the cream within the casing, will be subjected to a desirable aerating process.

When it is desired to remove the casing or can from its support 1, the pins 28 which serve to connect the bearing members 7ᶜ and 7ᵇ with the members 26 may be removed and the members 26 thrown outward to permit the removal of the shafts 15 and 14 together with the churn casing.

In order to permit of the condition of the cream in the can being observed without the removal of the lid, I have provided the glass covered sight opening 3ᵃ.

From the construction which I have shown and described, it will be seen that a comparatively simple and inexpensive churn construction is provided by means of which cream contained therein may be subjected to a high degree of agitation, such as is required for the rapid production of butter.

What I claim, is:

1. In a churn, the combination with a churn body, of a concave top plate therefor having an opening formed therethrough, a rotative shaft of considerably smaller diameter than said opening passing therethrough and being mounted for rotation independently of said top plate, means for imparting rotation to said shaft, and a fan carried by said shaft above said opening.

2. In a churn, the combination with a churn body, of a concave top plate therefor having an opening formed therethrough, a rotative shaft of considerably smaller diameter than said opening passing therethrough and being mounted for rotation independently of said top plate, means for imparting rotation to said shaft, a fan carried by said shaft above said opening but below the upper edge of the top plate, a second shaft disposed within the first named shaft, blades carried by the second shaft, and means for imparting rotation to the said second shaft in a direction opposite to the first named shaft.

In testimony whereof I affix my signature in presence of two witnesses.

ROBERT C. RUSSELL.

Witnesses:
M. WILKINS,
A. R. WILKINS.